United States Patent Office 3,550,371
Patented Dec. 29, 1970

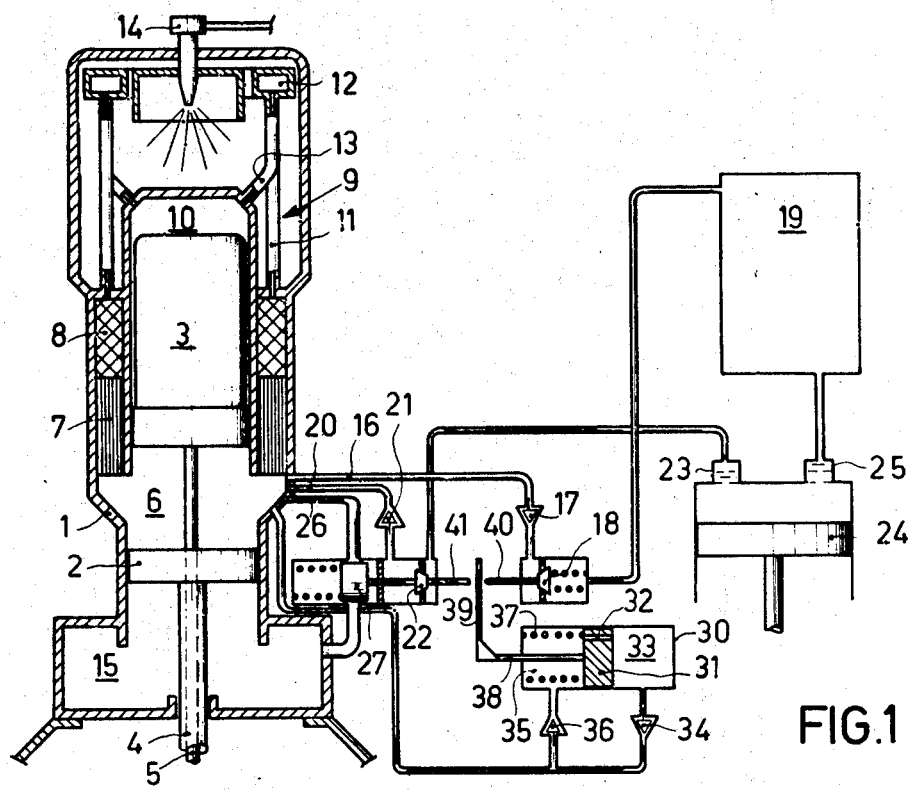
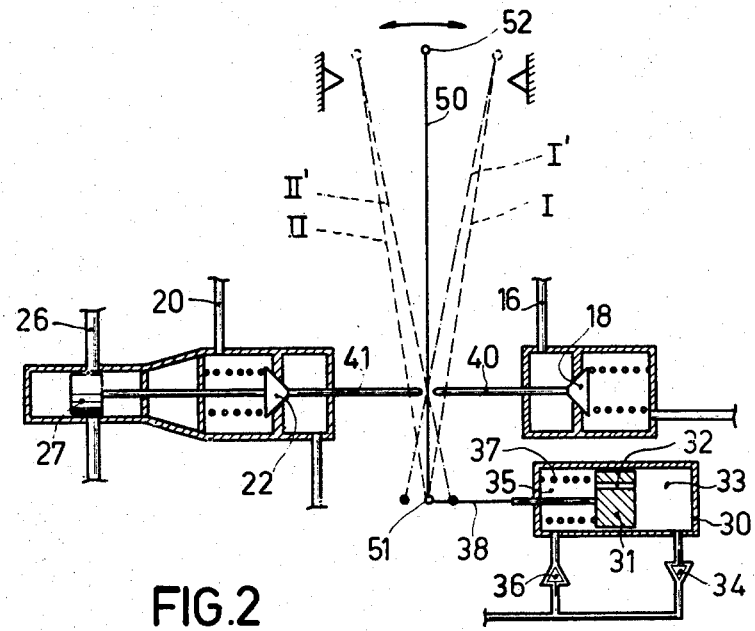

3,550,371
HOT GAS ENGINE WITH SPEED CONTROL
Hendrik Alphons Jaspers, Emmasingel, Eindhoven, Netherlands, assignor, by mesne assignments, to U.S. Philips Corporation, New York, N.Y., a corporation of Delaware
Filed Dec. 4, 1968, Ser. No. 781,011
Claims priority, application Netherlands, Dec. 22, 1967, 6717632
Int. Cl. F03g 7/06; F25b 9/00
U.S. Cl. 60—24       10 Claims

ABSTRACT OF THE DISCLOSURE

A hot-gas engine with a control means responsive to changes in engine speed via a duct communicating pneumatically with the working space, and an actuator driven by said control means responsive, to open and close valves permitting a flow of gas into and out of the working space corresponding to excessively low and high engine speeds respectively.

---

The invention relates to a control element suitable for controlling a hot-gas piston engine, the element comprising a movable structural part which assumes a certain position dependent on the engine speed and is coupled to one or more engine parts for adjustment.

It is known in hot-gas piston engines such as cold-gas refrigerators and hot-gas engines, to control the cold production and the power supplied by varying of the average pressure which prevails in the working space. Increasing the torque provided by a hot-gas engine is achieved by temporarily opening the stop valve in a medium supply duct connected to the working space, through which duct working medium flows from a supply vessel into the working space of the engine. Then the average pressure level rises and the torque provided increases. On the other hand the torque provided by the engine may be decreased by temporarily opening the stop valve in a medium exhaust duct connected to the working space through which duct working medium is pumped, for example, with the aid of a compressor from the working space back to the supply vessel. Since for reasons of construction the compressor must not have excessive dimensions, working medium will be pumped from the working space only at a comparatively slow rate, so that the torque is likewise decreased comparatively slowly. A quick decrease of torque can be obtained by opening not only the stop valve in the supply duct, but also a shutter in a duct connecting the working space and a space containing the same medium, as a result such a distortion of the pressure-volume diagram is obtained, that the torque provided is quickly decreased. In a cold-gas refrigerator the production of cold can be controlled in the same manner.

In using of this hot-gas engine for driving a generator where an accurately constant number of revolutions is required, the stop valves in the medium supply and exhaust ducts, and the shutter in the connection duct are operated by a speed regulator. Such a speed regulator very accurately controls the speed of revolutions, but it has the drawback of being expensive and vulnerable, while also requiring an expensive coupling between the regulator and the crank shaft of the engine.

In using the hot-gas engine where no special requirements are imposed on the speed of revolutions, for example, for traction, a speed regulator is still required because the torque-speed curve of the engine is distorted upon opening the shutter in the connection duct in such a manner that no stable point of intersection with the torque-speed line of the load is to be found any longer. This means that the engine either runs away or stalls. For this reason a feedback of the speed of revolutions is always necessary.

An object of the invention is to provide a strong and cheap control element of the kind described hereinbefore, which is not connected to the crank shaft through an intricate coupling and yet provides a speed-dependent signal by means of which the engine can be controlled.

The control element according to the invention is characterized in that the movable structural part is formed by a movable wall which separates two closed spaces from each other; these spaces communicating with each other through a capillary duct. The space on one side of the movable wall communicates through a nonreturn valve opening towards said space, and the space on the other side of said wall communicates through a nonreturn valve inhibiting a flow of medium towards said space, with a space of the engine containing a gaseous working medium and in which cyclic variations in pressure occur, and in which furthermore a resilient element is provided which exerts resilient forces on the movable wall in the direction of the first-mentioned space. This space of the engine which is connected to the control element in the manner described above may be formed by the working space itself or by, for example, the buffer space which also contains working medium and in which cyclic variations in pressure occur which are related to the pressure variations in the working space as regards frequency and amplitude. Apart from the narrow duct connecting the two spaces on either side of the movable wall, the maximum pressure which occurs in the said space of the engine will be adjusted in one space, while the minimum pressure which occurs in said space will be adjusted in the space on the other side. This results in a maximum pressure difference across the movable wall which pressure difference is compensated for by the resilient forces. Due to the narrow duct a quantity of medium will, however, flow from the high-pressure side to the low-pressure side. This causes a variation in the pressure difference across the movable wall. The quantity of medium which flows per cycle through the narrow duct will depend on the cycle period and the pressure level. This cycle period is inversely proportional to the number of revolutions so that at a high number of revolutions only little medium will flow per cycle from the high-pressure side to the low-pressure side, whereas this quantity of medium will be greater at a low number of revolutions. This means that the pressure difference across the movable wall will be great at a high number of revolutions and/or high pressure level whereas this pressure difference will be smaller at a low number of revolutions and/or low pressure level. The output signal of this control element, namely the displacement of the movable wall, which is directly proportional to the said pressure difference, is led towards the engine parts to be adjusted which may be, for example, the stop valves in the medium supply and medium exhaust ducts and the shutter in the connection duct. This provides a stable control without a speed regulator in which in addition torque speed curves are obtained which are advantageous for traction, namely a high torque at a low speed and a low torque at a high speed.

In addition to controlling the adjustment of the stop valves and the shutter, other engine parts can be controlled by means of the control element according to the invention. Thus it is possible to control the fan which supplies combustion air to the burner in a hot-gas engine with the aid of the control element so that the correct quantity of air is supplied at any power.

In a further advantageous embodiment the control element is formed by a closed cylinder in which a piston is adapted to reciprocate, a resilient element being provided between one side of the piston and the end of the cylinder facing it, the space accommodating this resilient element communicating with the space through a nonreturn valve opening towards the space of the engine, and the space on the other side of the piston communicating with the space of the engine through a nonreturn valve opening towards said space.

The invention furthermore relates to a hot-gas engine including one or more of these control elements, which engine comprises one or more working spaces, each of which communicates through a nonreturn valve opening towards the working space with a medium supply duct including a controllable stop valve, furthermore each working space communicates through a nonreturn valve inhibiting a flow of medium towards the working space with a medium exhaust duct including a controllable stop valve. A connection duct is connected to each working space, the other side of said connection duct adjoining a space containing the same medium as in the working space, or a connection duct is present between the medium supply and exhaust ducts and a shutter is provided in the connection duct(s) which shutter is continuously controllable between its closed position and its entirely open position.

According to the invention this hot-gas engine is characterized in that an operating device is provided by which, on the one hand the stop valve in the medium supply duct and on the other hand the stop valve in the medium exhaust duct and the shutter in the connection duct can be opened; the control element is coupled to the operating device in such a manner that upon increasing speed and/or increasing average pressure in the working space, the adjustment of the operating device is changed in such a manner that the stop valve in the medium supply duct moves towards its closing position or the stop valve in the medium exhaust duct and the shutter in the connection duct open or further open, respectively, while on the other hand the adjustment of the operating device is changed in the opposite sense upon decreasing speed and/or decreasing average pressure.

According to the invention the operating device may be formed by a lever which is pivotally connected to a piston rod connected to the movable wall or piston of the control element; the centre line of the piston rod is located in the plane of the pivotal movement of the lever, and one side of the lever cooperates with a structural part coupled to the stop valve in the supply duct, and the other side of the lever cooperates with a structural part coupled to the stop valve in the exhaust duct and to the shutter in the connection duct.

According to a further embodiment the operating device is formed by a piston adapted to reciprocate in a cylinder which is filled with liquid and communicates with two further cylinders likewise filled with liquid; this embodiment incorporates pistons which can be reciprocated against resilient force, the side of one of these last-mentioned pistons remote from the liquid being connected to the stop valve in the supply duct and the other side being connected to the stop valve in the exhaust duct and the shutter in the connection duct. A further cylinder is connected to the space containing liquid, which cylinder is closed by a piston which is connected to the piston rod of the piston of the control element. According to the invention the advantage of the hot-gas engine described hereinbefore is that upon a certain adjustment of the operating device, the motor provides a certain power. If the operating device would not cooperate with the control element, then, upon opening the stop valve in the supply duct, medium would continue to flow from the supply vessel towards the working space, independent of the adjustment of the operating device until the maximum pressure level is reached and the engine provides full-load power. The same, but in the reverse direction, would occur upon opening the stop valve in the exhaust duct. By coupling the operating device to the control element according to the invention it has been achieved that upon opening the suppletion cock as a result of the increasing pressure and possibly the increasing speed, the movable wall is displaced which displacement is imparted to the operating device in such manner that the suppletion cock moves to its closing position and closes at the instant that the engine provides the desired power.

In order that the invention may be readily carried into effect, it will now be described in detail, by way of example, with reference to the accompanying diagrammatic drawings.

BRIEF DESCRIPTION OF THE DRAWINGS

FIG. 1 is a schematic diagram, partly in section, of a preferred embodiment of the invention;

FIG. 2 is a schematic view of the control portion of the apparatus in FIG. 1;

FIG. 1 shows, not to scale, a hot-gas engine in which the reference numeral 1 indicates a cylinder, in which a piston 2 and a displacer 3 are movable. The piston 2 and the displacer 3 are connected by a piston rod 4 and a displacer rod 5, respectively, to a driving mechanism not shown which can move the piston 2 and the displacer 3 with a phase shift. A compression space 6 is provided between the piston 2 and the displacer 3 which space communicates with an expansion space 10 above the displacer 3 through a cooler 7, a regenerator 8 and a heater 9. The heater 9 consists of a plurality of pipes 11, which at one end are connected to the regenerator 8 and at the other end are connected to a ring duct 12 and a plurality of pipes 13 which at one end are connected to the ring duct 12 and at the other end to the expansion space 10. Heat is supplied through a burner 14 to the heater 9. A buffer space 15 is provided below the piston 2. A medium supply duct 16 including a nonreturn valve 17 opening towards the working space, and a controllable stop valve 18 is connected to the working space, the other side of the supply duct 16 being connected to a supply vessel 19 containing medium under high pressure. Furthermore, a medium exhaust duct 20 including a nonreturn valve 21 inhibiting flow of medium towards the working space is connected to the working space. Furthermore, the medium exhaust duct 20 includes a controllable stop valve 22, the other side of the medium exhaust duct being connected to the inlet 23 of compressor 24. The outlet 25 of the compressor is connected to the supply vessel 19. Furthermore, a connection duct 26 including a controllable shutter 27 is connected to the working space, the other side of said connection duct being connected to the buffer space 15. The hot-gas engine furthermore includes a control element which is formed by a closed cylinder 30, in which a piston 31 is movable. Piston 31 is provided with a capillary aperture 32. The space 33 on one side of the piston 31 communicates with the working space through a nonreturn valve 34 which opens toward the space 33, while the space 35 on the other side of the piston 31 communicates with the working space through a nonreturn valve 36 which does not pass flow of medium towards the space 35. A compression spring 37 is furthermore active on the piston 31. The piston 31 is provided with a piston rod 38 supporting a structural part 39 which lies in between valve rods 40 and 41, which are connected to the stop valve 18 in the medium supply duct and to the stop valve 22 in the medium exhaust duct and the shutter 27 in the connection duct.

Figure 3:
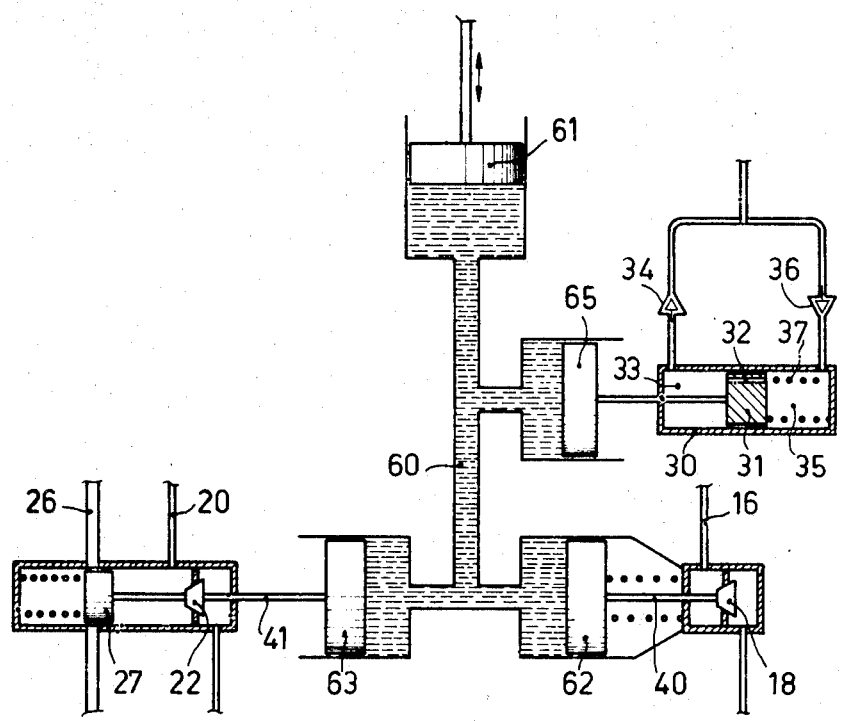
FIG. 3 is a schematic view of another embodiment of the control portion of FIG. 1.

The operation of the hot-gas engine itself is assumed to be known. The operation of the control element is as follows. Since the space 33 communicates with the working space of the hot-gas engine through a nonreturn valve 34 opening towards said space, the maximum pressure which occurs in the working space will tend to adjust itself in the space 33. The space 35 communicates with the working space through a nonreturn valve 36 which only passes flow of medium towards the working space, so that the minimum pressure which occurs in the working space will tend to adjust itself in the space 35. As a result a pressure difference directed to the left prevails across the piston 31. Since the spaces 33 and 35 communicate with each other through the narrow duct 32, a certain amount of medium will flow from space 33 to space 35. This will decrease the pressure difference across the piston 32. The amount of medium which flows per cycle from the space 33 to the space 35 is determined not only by the pressure difference, but also by the period which is available for each cycle. This period is dependent on the speed of revolutions. For a high speed of revolutions only a short period will be available so that only little medium can flow to the space 35 per revolution and a great pressure difference will prevail across the piston 31. For a lower speed more medium will flow from the space 33 to the space 35 per cycle, so that the pressure difference across piston 31 becomes smaller. Starting from the balanced situation as shown in FIG. 1, the pressure difference across the piston 31 will increase as the speed increases, and this piston will be pushed more to the left due to this pressure difference. Due to this displacement to the left the structural part 39, which is connected through the piston rod 38 to piston 31, will push the valve stem 41 to the left, so that the stop valve 22 in the medium exhaust duct is opened while also the shutter 27 acquires its open position. As a result medium is removed from the working space through the stop valve 22 on the one hand, while on the other hand a phase shaft of the pressure-volume diagram occurs due to connecting the working space through the connection duct 26 and the buffer space 15 so that the power provided by the hot-gas engine decreases. Since the power provided by the engine decreases this will correspond again to the desired power, so that the speed of revolutions decreases again and the pressure difference across the piston 31 also becmes smaller which results in this piston being displaced to the right. Since medium is pumped from the working space to the supply vessel through the stop valve 22 and the compressor 24, the average pressure level will furthermore have decreased which also results in a decrease of the pressure difference across the piston 31 so that also as a result thereof the piston will move to the right. In this manner, a new balanced situation is reached at a lower average pressure and a different speed of revolutions.

If on the other hand the speed of revolution decreases for some reason or other, starting from the balanced situation of FIG. 1, the pressure difference across the piston 31 will become smaller so that this system is pushed to the right by the spring 37. This has the result that the structural part 39 now opens the stop valve 18 in the medium supply duct 16. Consequently, medium is supplied to the working space, so that the power provided by the engine increases. Due to the increase of the average pressure level the pressure difference across piston 31 will increase so that this piston is pushed to the left. Furthermore, the speed of revolutions will increase because the power provided increases, so that the pressure difference across the piston 31 increases which piston is further pushed back to the left.

It will be evident from the foregoing that a stable control of the hot-gas engine is obtained by means of a very simple element. Furthermore, the element controls in such manner that a large torque is obtained at a low speed of revolutions, and a low torque is obtained at a high speed of revolutions. This is especially advantageous for traction purposes.

FIG. 2 once more shows the control portion of the hot-gas engine of FIG. 1 in which the corresponding components are indicated by the same reference numerals. As shown in the drawing the only difference is that now an operating device in the form of a lever 50 is present by means of which the stop valves 18 and 22 and the shutter 27 are adjustable. The lever 50 is coupled through a pivot 51 to the piston rod 38 of the control element. In the balanced situation as shown in FIG. 2, the operation of the control is the same as for the engine of FIG. 1. If the upper end 52 of lever 50 is displaced to the right, pivot 51 initially remains in place, and the lever assumes the position I indicated by a broken line, the stop valve 18 in the medium supply duct thus being open. Due to the supply of medium the average pressure in the working space increases. Due to this and as a result of the increasing speed of revolutions, the pressure difference across piston 31 will increase so that this piston is displaced to the left. This continues as long as the lever 50 assumes the position I' indicated by a dot-and-dash line. The stop valve 18 is then closed again, and the engine then provides a greater power.

If on the other hand the lever 50 is moved to the right it assumes, for example, the position II indicated by a broken line. The stop valve 22 in the medium exhaust duct and the shutter 27 in the connection duct 26 are then opened. Due to opening the shutter 27 the torque provided is instantaneously decreased and thus the speed of revolutions and the pressure difference across piston 31 will decrease so that this piston is displaced to the right. Furthermore medium is removed via the stop valve 22 so that the average pressure in the working space decreases. Also as a result thereof the pressure difference across the piston 31 decreases. At the instant of the lever 50 assuming the position II' both the stop valve 22 and the shutter 27 are closed again. In this new balanced situation the engine will provide a lower power. By coupling the lever 50 in this manner to the piston 31 of the control element, it has been achieved that a given power provided by the engine is associated with each position of the lever 50.

FIG. 3 also shows the control portion of a hot-gas engine of FIG. 1, in which the operating device is now formed by a hydraulic system. This system consists of a space 60 containing liquid which at one end is bounded by an adjustable piston 61 and at the other end by two pistons 62 and 63. The piston 62 is connected through the valve stem 40 to stop valve 18 in the medium supply duct, while piston 63 is connected through valve stem 41 to stop valve 22 in the medium exhaust duct and shutter 27 in the connection duct. Furthermore, the space 60 containing liquid is bounded by a third piston 65 which is connected to piston 31 of the control element.

If piston 61 is displaced downwards, piston 62 will move to the right and stop valve 18 will be opened. As a result medium is supplied to the working space and the power provided increases so that the speed of revolutions will also increase. As a result, the pressure difference across piston 31 of the control element will increase so that this piston is displaced to the right. Consequently, piston 65 also moves to the right so that the pressure of the liquid in space 60 decreases. As a result piston 62 is moved to the left under influence of the spring acting thereon, so that stop valve 18 closes.

On the other hand piston 63 will move to the left when piston 61 moves upwards so that stop valve 22 and shutter 27 are opened. Consequently, the average pressure and the speed of revolutions will decrease again so that piston 31 and hence piston 65 start to move to the left, thus again compensating for the initial displacement of piston 61 and the stop valve 22 and shutter 27 close again.

Figure 4:
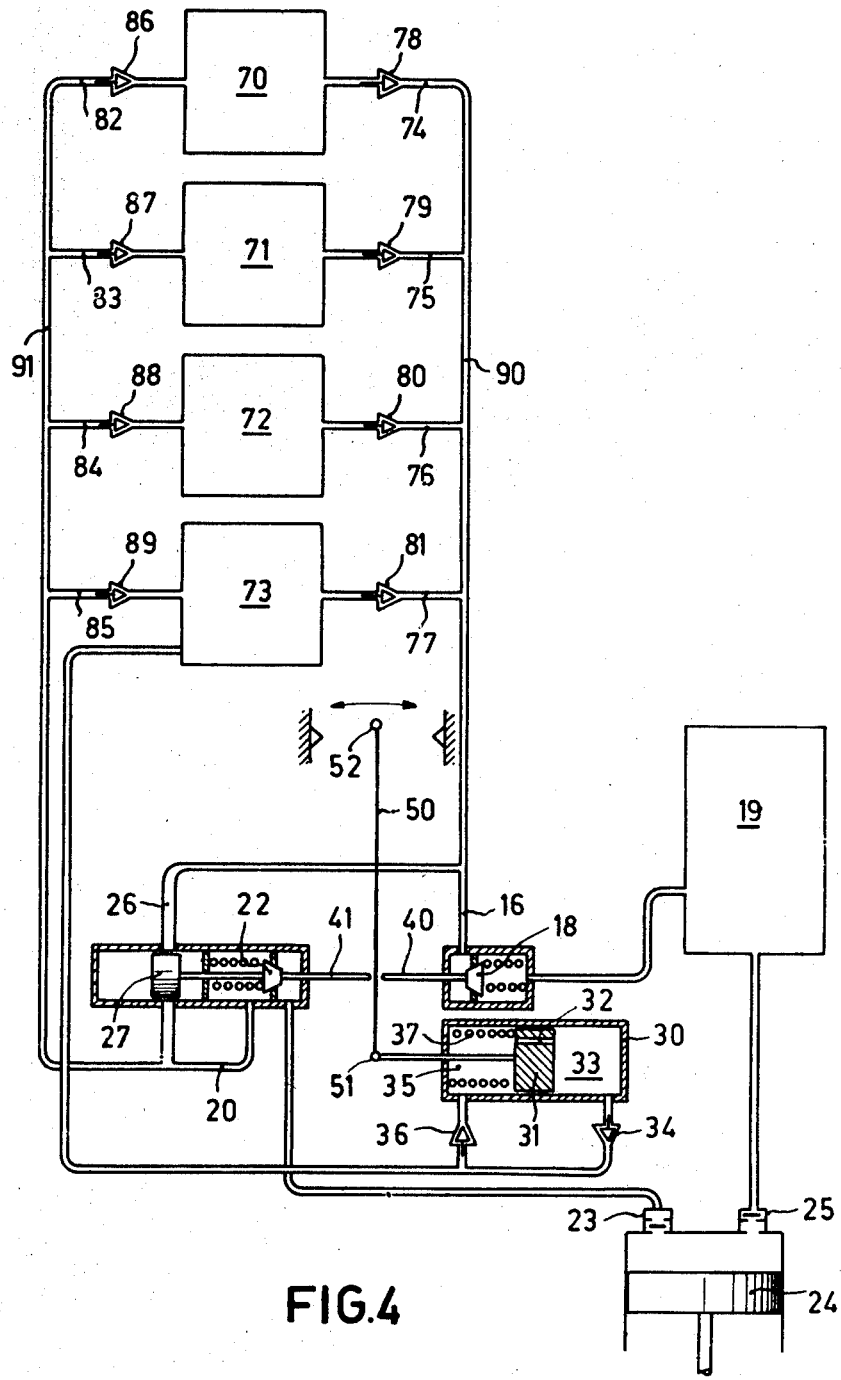
FIG. 4 is a schematic view of the invention in a 4-cylinder engine.

Although in the foregoing figures, reference has only been made to a monocylinder hot gas engine for the sake of simplicity, it will be evident that the control element is equally well suitable for multicylinder engines. For illustration there of FIG. 4 shows a four-cylinder engine. Here the working spaces of a hot-gas engine are shown by the reference numerals 70, 71, 72 and 73. Medium supply ducts 74, 75, 76 and 77 including non-return valves 78, 79, 80 and 81 opening towards the working spaces are connected to each working space. Furthermore, medium exhaust ducts 82, 83, 84 and 85 including non-return valves 86, 87, 88 and 89 which inhibit flow of medium towards the working spaces are connected to each working space. The sides of the supply ducts remote from the working spaces are connected to a common supply duct 70 while the exhaust ducts are connected to a common exhaust duct 91.

Furthermore, a control system with operating device is provided which corresponds to that of FIG. 2. Connection duct 26 including shutter 27 is provided between the common supply and exhaust ducts 90 and 91, respectively. Upon opening the shutter the medium will now be circulated from the working spaces through the nonreturn valves 82, 83, 84 and 85 via the connection duct 26 and through the nonreturn valves 78, 79, 80 and 81 back to the working spaces. As a result the pressure-volume diagram in the working spaces changes and the torque provided decreases. The further construction and operation of the control device is entirely identical to that of FIGS. 1 and 2, so that a further description thereof can be omitted.

In the description of the figures the operation of the control element has been described with reference to its use in a hot-gas engine. It will, however, be evident that the control element may be used in the same manner in cold-gas refrigerators.

It will be evident from the foregoing that the present invention provides a surprisingly simple control element for controlling hot-gas piston engines, in which the control element controls in such manner that a stable torque-speed curve is always obtained. The torque-speed curves obtained by this control element are especially interesting for traction purposes, because the control element controls in such a manner that a high torque is obtained at a low number of revolutions and a low torque is obtained at a high number of revolutions.

What is claimed is:

1. In a hot-gas engine including a variable volume working space and buffer space on opposite sides of a piston which moves reciprocally at speeds corresponding to the engine's output speed, the improvement in combination therewith comprising:
    (a) a monitor means communicating pneumatically via first duct means with the working space and responsive to variations in engine speed from a predetermined nominal speed,
    (b) a medium supply having a high pressure outlet and a low pressure inlet,
    (c) first valve means openable for permitting medium flow from the supply outlet to the working space,
    (d) second valve means openable for permitting medium flow from the working space to the supply inlet,
    (e) actuating means selectively communicating said response to speed variation of the monitor means to said first and second valve means for selectively opening same, whereby variations in engine speed are automatically correctible.

2. Apparatus according to claim 1 further comprising a by-pass duct between the working and buffer spaces, and a third adjustable valve in this duct, the actuating means opening this third valve when the second valve is opened, thereby reducing the pressure difference across the piston and causing a phase shift in the working space pressure variations.

3. Apparatus according to claim 1 wherein said monitor means comprises:
    (a) a closed housing,
    (b) a member movable within the housing and thus defining and separating first and second spaces on opposite sides of the member, the member including a capillary duct therethrough interconnecting said first and second spaces,
    (c) first one-way valve permitting fluid flow only into the first space,
    (d) second one-way valve permitting fluid flow only out of the second space,
    (e) second duct means communicating both said one-way valves with said working space of the engine,
whereby the pressure variations in the working space corresponding to speed changes, are communicated via the second duct means and one-way valves to said housing, causing the member to move toward one of said first and second spaces in response to said engine speed variation.

4. Apparatus according to claim 3 wherein said actuating means of said monitor means comprises a lever driven by said moveable member, and extending to actuate said first and second valve means.

5. Apparatus according to claim 4 wherein the housing is a closed cylinder, and the member is an axially movable piston.

6. Apparatus according to claim 5 further comprising a resilient element applying a force on the piston urging it toward the second space within the cylinder, the force being approximately equal to the force applied by the medium pressure in the first space during normal operation of the engine at a nominal speed.

7. In a hot-gas engine including variable volume working space and buffer space on opposite sides of a piston which moves reciprocally at speeds corresponding to the engine's output speed, the improvement in combination therewith comprising:
    (a) a monitor means communicating pneumatically via first duct means with the working space and responsive to variations in engine speed from a predetermined nominal speed,
    (b) a medium supply having a high pressure outlet and a low pressure inlet,
    (c) first valve means openable for permitting medium flow from the supply outlet to the working space,
    (d) second valve means openable for permitting medium flow from the working space to the supply inlet,
    (e) an actuator means operable between neutral condition and alternate conditions for selectively opening said first and second valve means to control changes in engine speed, said monitor means responding to speed variations and accordingly returning the actuator means to the neutral condition after the speed change occurs.

8. Apparatus according to claim 7 wherein said actuator means comprises a lever that engages said first and second valve means.

9. Apparatus according to claim 7 wherein said actuator means is a hydraulic system, comprising a container of liquid, means for selectively affecting the pressure of said liquid, means reacting to pressure changes in the liquid for selectively opening said first and second valve means.

10. Apparatus according to claim 1 wherein the engine comprises a plurality of working spaces, and first and second common ducts through which medium is transported (i) from said first valve means to the working spaces, and (ii) from said working spaces to said second valve means.

References Cited

UNITED STATES PATENTS

| | | | |
|---|---|---|---|
| 2,746,241 | 5/1956 | Dros et al. | 60—24 |
| 2,794,315 | 6/1957 | Meijer | 60—24 |
| 2,867,973 | 1/1959 | Meyer | 60—24 |
| 3,036,427 | 5/1962 | Meijer | 60—24 |
| 3,458,994 | 8/1969 | Heffner | 60—24 |
| 3,458,995 | 8/1969 | Heffner et al. | 60—24 |

MARTIN P. SCHWADRON, Primary Examiner

R. R. BUNEVICH, Assistant Examiner

U.S. Cl. X.R.

62—6

PO-1050
(5/69)

UNITED STATES PATENT OFFICE
CERTIFICATE OF CORRECTION

Patent No. 3,550,371        Dated   December 29, 1970

Inventor(s) H.A. JASPERS

It is certified that error appears in the above-identified patent and that said Letters Patent are hereby corrected as shown below:

Col. 1, line 53, ", as" should be -- . As--

Col. 5, line 51, after "this" "system" should be --piston-

Signed and Sealed this 17th day of October 1972.

(SEAL)
Attest:

EDWARD M. FLETCHER, JR.        ROBERT GOTTSCHALK
Attesting Officer              Commissioner of Patent